United States Patent
Han et al.

(10) Patent No.: US 9,845,241 B2
(45) Date of Patent: Dec. 19, 2017

(54) METHOD OF PURIFYING YELLOW PHOSPHORUS

(71) Applicant: OCI COMPANY LTD., Seoul (KR)

(72) Inventors: Seung-Hyun Han, Seongnam-si (KR); Wook Chang, Seongnam-si (KR); Yeon-Hee Lee, Gunsan-si (KR)

(73) Assignee: OCI COMPANY LTD., Seoul (KR)

( * ) Notice: Subject to any disclaimer, the term of this patent is extended or adjusted under 35 U.S.C. 154(b) by 220 days.

(21) Appl. No.: 14/958,854

(22) Filed: Dec. 3, 2015

(65) Prior Publication Data
US 2016/0185599 A1 Jun. 30, 2016

(30) Foreign Application Priority Data
Dec. 24, 2014 (KR) ........................ 10-2014-0188707

(51) Int. Cl.
*C01B 25/047* (2006.01)

(52) U.S. Cl.
CPC ................... *C01B 25/047* (2013.01)

(58) Field of Classification Search
None
See application file for complete search history.

(56) References Cited

U.S. PATENT DOCUMENTS

| | | | | |
|---|---|---|---|---|
| 3,780,164 A * | 12/1973 | Muller | .................. | C01B 25/047 423/322 |
| 4,299,806 A * | 11/1981 | Kuck | .................... | C01B 25/047 210/772 |
| 5,292,494 A * | 3/1994 | Inao | ..................... | C01B 25/023 423/322 |
| 5,989,509 A * | 11/1999 | Gunkel | ................. | C01B 25/047 423/322 |
| 6,146,610 A * | 11/2000 | Gunkel | ................. | C01B 25/047 423/322 |

FOREIGN PATENT DOCUMENTS

| | | |
|---|---|---|
| CN | 1259921 A | 7/2000 |
| CN | 101774559 A | 7/2010 |
| CN | 102336398 A | 2/2012 |
| JP | 60016368 B2 | 4/1985 |
| JP | H03237007 A | 10/1991 |
| JP | 06040710 A | 2/1994 |
| JP | 2000203813 A | 7/2000 |
| JP | 4062569 B2 | 3/2008 |
| JP | 2012017230 A | 1/2012 |
| KR | 19947002763 A | 9/1994 |
| KR | 1020120005960 A | 1/2012 |
| TW | 201202126 A | 1/2012 |
| WO | 2012154498 A2 | 11/2012 |

OTHER PUBLICATIONS

Japanese Office Action dated Jan. 17, 2017 in connection with the counterpart Japanese Patent Application No. 2015-241460.
Chinese Office Action dated Jun. 30, 2017 in connection with the counterpart Chinese Patent Application No. 201510957512.1.

* cited by examiner

*Primary Examiner* — Wayne Langel
(74) *Attorney, Agent, or Firm* — Hauptman Ham, LLP

(57) ABSTRACT

The present invention relates to a method of purifying yellow phosphorus, and more particularly, to a method of effectively removing impurities from yellow phosphorus used as raw materials of a phosphoric acid to increase purity of the phosphoric acid, the method including: removing impurities from the phosphoric acid by adding an oxidizing agent to the yellow phosphorus, followed by stirring; and adding a solution including an additive having a specific functional group in a chemical structure to the yellow phosphorus from which the impurities are removed, followed by stirring.

17 Claims, No Drawings

METHOD OF PURIFYING YELLOW PHOSPHORUS

CROSS-REFERENCE TO RELATED APPLICATIONS

This application claims the benefit of Korean Patent Application No. 10-2014-0188707, filed on Dec. 24, 2014, entitled "METHOD OF PURIFYING YELLOW PHOSPHORUS", which is hereby incorporated by reference in its entirety into this application.

BACKGROUND

1. Technical Field

The present invention relates to a method of purifying yellow phosphorus, and more particularly, to a method of effectively removing impurities from yellow phosphorus used as raw materials of a phosphoric acid to increase purity of the phosphoric acid, the method including: removing impurities from the phosphoric acid by adding an oxidizing agent to the yellow phosphorus, followed by stirring; and removing impurities by adding a solution including an additive having a specific functional group in a chemical structure to the yellow phosphorus from which the impurities are removed, followed by stirring.

2. Description of the Related Art

Phosphoric acid is used to remove a silicon nitride film deposited on a semiconductor wafer, or metal wiring etching of a display such as a thin film transistor-liquid crystal display (TFT-LCD). In the semiconductor, the phosphoric acid is mainly used in a form in which pure phosphoric acid is mixed with an additive. In the TFT-LCD, the phosphoric acid is mainly used in a form in which a mixed acid including various kinds of acids such as a phosphoric acid, a nitric acid, an acetic acid, and the like, is mixed with the additive.

A method of producing the phosphoric acid may be largely classified into two ways.

That is, there are 1) a wet method of using a solution during the production, and 2) a dry method of adding water at the end of the production.

Among them, in the dry method, the phosphoric acid is produced by oxidizing and combusting yellow phosphorus ($P_4$) which is a raw material to form an oxide dimer ($P_4O_{10}$) of phosphorus pentoxide ($P_2O_5$), and adding water thereto. Unlike the wet method, the dry method has an advantage in that significantly high concentration of phosphoric acid having 80 to 90 mass % is capable of being produced by controlling an amount of water to be added at the end of the production.

The dry method is beneficial in view of the production cost since the method is not complicated; however, has a problem in that purity of the yellow phosphorus as the raw material has a direct effect on purity of phosphoric acid to be produced.

The yellow phosphorus ($P_4$) being a raw material of the phosphoric acid is present in nature in the form of ore. Upon analyzing the yellow phosphorus after mining, the yellow phosphorus includes large amounts of arsenic and antimony included in the same group as the periodic table, together with phosphorus, and large amounts of metal impurities such as iron, aluminum, and the like.

In order to produce a high purity of phosphoric acid, methods of purifying the raw material yellow phosphorus while utilizing the advantages of the drying method as described above have been developed.

Regarding this, Japanese Patent Laid-Open Publication No. Sho 60-016368 discloses a method of purifying phosphorus, specifically, a method of separating impurities oxidized by an mixed acid including: mixing 6-18 mass % of nitric acid and 15-38 mass % of sulfuric acid at a molar ratio of 1:1 to 1:4, and treating yellow phosphorus with a mixed acid having a concentration of all acids (molar concentration of nitric acid+molar concentration of sulfuric acid) in the range of 3.5 to 6.5 moles at 45 to 100° C.

In addition, U.S. Pat. No. 6,146,610 discloses a method of removing arsenic from an element, phosphorus, specifically, a method of treating phosphorus with oxidized iodine including: mixing an appropriate amount of iodine with hydrogen peroxide and removing arsenic present in the phosphorus at a temperature of 45 to 95° C. under condition in which an amount of the oxidizing agent is no more than 10 mass % as active oxygen relative to weight of the phosphorus.

Further, Korean Patent Laid-Open Publication No. 2012-0005960 discloses a method of producing high purity elemental phosphorus and a method of producing high purity phosphoric acid, specifically, a method of simultaneously removing antimony and arsenic by contacting an iodic acid-containing compound such as an iodic acid, an iodate, and the like, with phosphorus, to be oxidized, and reacting the obtained oxide with a chelating agent.

Further, Japanese Patent Laid-Open Publication No. Hei 06-040710 discloses a method of producing high purity phosphorus, specifically, a method of removing impurities by converting arsenic into arsenite using oxidized iodine and iodic acid compound in order to remove arsenic in yellow phosphorus, followed by distillation.

However, these methods according to the related art have problems as follows.

Most of the methods for purifying impurities from the yellow phosphorus used as the raw material are an oxidation method using an oxidizing agent, wherein the oxidizing agent to be used is a strong acid such as a sulfuric acid, a nitric acid, an iodic acid, or the like.

That is, the methods according to the related art have a core constitution of purifying the yellow phosphorus, including liquefying the yellow phosphorus most of which has a melting temperature of 44.1° C. by increasing a temperature, stirring the phosphorus with materials including the oxidizing agents, to oxidize the impurities such as antimony, arsenic, and the like, and removing oxidized impurities.

However, the raw material yellow phosphorus is possible to be changed into phosphorus pentoxide, wherein the phosphorus pentoxide reacts with water present in a reaction solution to be phosphoric acid, resulting in loss of the raw material yellow phosphorus.

In fact, upon reviewing Examples of Japanese Patent Laid-Open Publication Sho 60-016368 among the above-described related art documents, it may be appreciated that a mass of the raw material yellow phosphorus is reduced from 20 g to 13 g after purification, and a yield is about 70%, which is significantly low.

Meanwhile, since iodine compounds have significantly strong oxidizing power, the method of using iodine, iodide or iodic acid is capable of effectively removing impurities such as antimony, arsenic, and the like. However, the iodine is a hazardous material, and has difficulty in treatment during the production, and has a problem in waste water treatment after being reacted. Further, since other side reactions may proceed due to iodide ions that may remain in the raw material yellow phosphorus, remaining iodide ions are required to be confirmed.

Therefore, a method capable of effectively removing metal impurities such as antimony, iron, aluminum, and the like, from the yellow phosphorus as the raw material of phosphoric acid, without having the above-described problems, has been required to be developed.

SUMMARY

It is an aspect of the present invention to provide a method of effectively removing impurities from yellow phosphorus used as raw materials of a phosphoric acid to increase purity of the phosphoric acid, the method including removing impurities from the phosphoric acid by adding an oxidizing agent to the yellow phosphorus, followed by stirring; and removing impurities by adding a solution including additive having a specific functional group in a chemical structure to the yellow phosphorus from which the impurities are removed, followed by stirring.

The present invention is not limited to the above aspect and other aspects of the present invention will be clearly understood by those skilled in the art from the following description.

In accordance with one aspect of the present invention, there is provided a method of effectively removing impurities from yellow phosphorus used as raw materials of a phosphoric acid to increase purity of the phosphoric acid, the method including: removing impurities from the yellow phosphorus by adding an oxidizing agent to the yellow phosphorus, followed by stirring; and removing impurities by adding a solution including an additive represented by the following Chemical Formula 1 to the yellow phosphorus from which the impurities are removed, the additive having a specific functional group in a structure, followed by stirring:

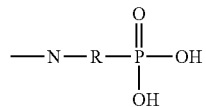

[Chemical Formula 1]

R is C1-C5 alkyl.

In accordance with another aspect of the present invention, there is provided a method of removing impurities from yellow phosphorus by adding a solution including an oxidizing agent and an additive represented by the following Chemical Formula 1 to the yellow phosphorus, the additive having a specific functional group in a structure, followed by stirring:

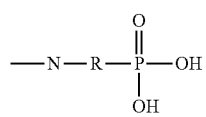

[Chemical Formula 1]

R is C1-C5 alkyl.

DETAILED DESCRIPTION

Various advantages and features of the present invention and methods accomplishing thereof will become apparent from the following description of embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims.

Hereinafter, a method of purifying yellow phosphorus according to preferable exemplary embodiments of the present invention will be described in detail.

According to an exemplary embodiment of the present invention, there is provided a method of effectively removing impurities from yellow phosphorus used as raw materials of a phosphoric acid, the method including: removing impurities from the yellow phosphorus by adding an oxidizing agent to the yellow phosphorus, followed by stirring; and removing impurities by adding a solution including an additive represented by the following Chemical Formula 1 to the yellow phosphorus from which the impurities are removed, the additive having a specific functional group in a structure, followed by stirring:

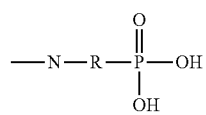

[Chemical Formula 1]

R is C1-C5 alkyl.

First, impurities are removed from the yellow phosphorus by adding the oxidizing agent to the yellow phosphorus which is a purification target, followed by stirring.

In the present invention, the oxidizing agent is a material mixed with the raw material yellow phosphorus to have oxidizing power, and may include a hydrogen peroxide, organic peroxide, and a strong acid.

The organic peroxide includes organic peroxide having a structure of R—O—O—R, organic hydroperoxide having a structure of R—O—OH, organic perester having a structure of R—OO—OR, and the like. Specifically, there are diacetyl peroxide, bis(1-oxopropyl) peroxide, t-butyl peroxide, t-butyl hydroperoxide, t-butyl peracetate, t-butyl peroxypivalate, and the like.

The strong acid includes nitric acid, sulfuric acid, and hydrochloric acid having oxidizing power, and may include mixed acids having various combinations such as a mixed acid of nitric acid and sulfuric acid, a mixed acid of nitric acid and hydrogen peroxide, peroxymonosulfuric acid formed by mixing hydrogen peroxide with sulfuric acid, and the like.

Hydrogen peroxide is separated into water and oxygen as shown in Equation (1) below, thereby generating a strong oxidization action, such that metal impurities present in the yellow phosphorus are converted into an ionic form which is well soluble in water:

$$2H_2O_2 \rightarrow 2H_2O + O_2 \qquad \text{Equation (1)}$$

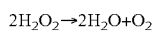

In particular, hydrogen peroxide used as the oxidizing agent in the present invention is diluted with water, wherein a concentration of the diluted hydrogen peroxide is preferably 3 wt % to 6 wt % relative to water. When the concentration of the hydrogen peroxide is less than 3 mass %, a metal oxidation rate is deteriorated and it is difficult to remove the impurities, due to low concentration of the oxidizing agent in the solution. In addition, when the concentration of the hydrogen peroxide is more than 6 mass %, the raw material yellow phosphorus is converted into phosphorus pentoxide due to an excessive amount of oxidizing agent, and accordingly, loss of the raw material is increased, which deteriorates a final yield.

The impurities to be removed in the above step may include any one selected from the group consisting of aluminum, iron, and antimony, as a metal ion. In particular, the antimony may be excellently removed.

A processing temperature which is effective in removing the impurities in the above step is preferably 45 to 75° C. When the processing temperature is less than 45° C., the yellow phosphorus is present as a solid, such that the stirring is not effective, and when the processing temperature is more than 75° C., the hydrogen peroxide is rapidly decomposed, thereby decreasing an oxidization efficiency, or a temperature of a continuous reaction container is increased due to a decomposition reaction of hydrogen peroxide which is an exothermic reaction, thereby causing risk of safety.

Next, the present invention includes removing impurities by adding the solution including an additive represented by the following Chemical Formula 1 to the yellow phosphorus from which the impurities are removed, the additive having a specific functional group in a structure, followed by stirring:

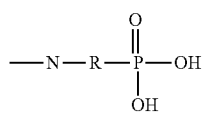

[Chemical Formula 1]

R is C1-C5 alkyl.

In the present invention, the additive represented by Chemical Formula 1 above produces a complex by binding the metal ions to PO⁻ positioned at an end group, such that the metal impurities present in the yellow phosphorus may be effectively removed.

In particular, the present invention uses the additive in which a nitrogen atom is present at a position close to PO⁻ positioned at the end group as being represented by Chemical Formula 1 above, such that additional electronic exchange takes place between unshared electron pair present in the nitrogen atom and the metal ions, thereby forming a more stable complex. Therefore, the metal impurities present in the yellow phosphorus may be significantly and effectively removed.

As specific examples, the additive represented by Chemical Formula 1 above may be at least one selected from the group consisting of amino-tris-methylene phosphoric acid (ATMP), dimethylene triamine pentamethylene phosphoric acid (DTPMP), bis hexamethylene triamine pentamethylene phosphoric acid (BHTPMP), ethylenediamine tetramethylene phosphoric acid (EDTMP), and hexamethylene diamine tetramethylene phosphoric acid (HDTMP).

In the additives, the nitrogen atom is present at a position close to PO⁻ positioned at the end group, such that additional electronic exchange takes place between the unshared electron pair present in the nitrogen atom and the metal ions, thereby forming a more stable complex. Therefore, the metal impurities present in the yellow phosphorus may be significantly and effectively removed.

In the present invention, the solution including the additive represented by Chemical Formula 1 preferably includes any one selected from the group consisting of hydrogen peroxide, organic peroxide, and a strong acid, as a solvent.

That is, the hydrogen peroxide which is the solvent forms the complex between the impurities and the additive represented by Chemical Formula 1 above. In particular, hydrogen peroxide is separated into water and oxygen, thereby generating a strong oxidization action, such that metal impurities still present in the yellow phosphorus are converted into an ionic form which is well soluble in water. Accordingly, the impurities converted into the ionic form are allowed to form the complex with the additive represented by Chemical Formula 1 above.

Here, the impurities to be removed may include any one selected from the group consisting of aluminum, iron, and antimony, as a metal ion.

A processing temperature which is effective in removing the impurities is preferably 45 to 75° C. When the processing temperature is less than 45° C., the yellow phosphorus is present as a solid, which is not liquefied, such that the stirring is not effective, and when the processing temperature is more than 75° C., the hydrogen peroxide is rapidly decomposed, thereby decreasing an oxidization efficiency, or a temperature of a continuous reaction container is increased due to a decomposition reaction of hydrogen peroxide which is an exothermic reaction, thereby causing risk of safety.

The additive represented by Chemical Formula 1 used in this step preferably has a concentration of 3 wt % or less relative to the yellow phosphorus. When the concentration of the additive is more than 3 wt %, the yellow phosphorus may be oxidized due to additional oxidization. This step has objects of effectively forming and removing the complex of the metal ions by adding the additive represented by Chemical Formula 1, while minimizing the oxidization by hydrogen peroxide.

Meanwhile, according to another exemplary embodiment of the present invention, there is provided a method of removing impurities from yellow phosphorus by adding a solution including an oxidizing agent and an additive represented by the following Chemical Formula 1 to the yellow phosphorus, the additive having a specific functional group in a structure, followed by stirring:

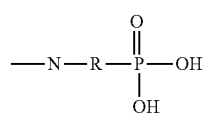

[Chemical Formula 1]

R is C1-C5 alkyl.

Similar to the previously described exemplary embodiment of the present invention, in the present exemplary embodiment, the oxidizing agent is a material mixed with the raw material yellow phosphorus to have oxidizing power, and may include any one selected from the group consisting of a hydrogen peroxide, organic peroxide, and a strong acid.

The organic peroxide includes organic peroxide having a structure of R—O—O—R, organic hydroperoxide having a structure of R—O—OH, organic perester having a structure of R—OO—OR, and the like. Specifically, there are diacetyl peroxide, bis(1-oxopropyl) peroxide, t-butyl peroxide, t-butyl hydroperoxide, t-butyl peracetate, t-butyl peroxypivalate, and the like.

The strong acid includes nitric acid, sulfuric acid, and hydrochloric acid having oxidizing power, and may include mixed acids having various combinations such as a mixed acid of nitric and sulfuric acid, a mixed acid of nitric acid and hydrogen peroxide, peroxymonosulfuric acid formed by mixing hydrogen peroxide with sulfuric acid, and the like.

Hydrogen peroxide is separated into water and oxygen as shown in Equation (1) below, thereby generating a strong oxidization action, such that metal impurities present in the yellow phosphorus are converted into an ionic form which is well soluble in water.

$$2H_2O_2 \rightarrow 2H_2O + O_2 \qquad \text{Equation (1)}$$

The hydrogen peroxide used as the oxidizing agent in the present invention is diluted with water, wherein a concentration of the diluted hydrogen peroxide is preferably 3 wt % to 6 wt % relative to water. When the concentration of the hydrogen peroxide is less than 3 mass %, a metal oxidation rate is deteriorated and it is difficult to remove the impurities, due to low concentration of the oxidizing agent in the solution. In addition, when the concentration of the hydrogen peroxide is more than 6 mass %, the loss of the raw material yellow phosphorus is increased due to an excessive amount of oxidizing agent, which deteriorates a yield.

The impurities to be removed in this step are metal ions ionized by the oxidizing agent, wherein the metal ions may include any one selected from the group consisting of aluminum, iron, and antimony.

In still another exemplary embodiment of the present invention, the additive represented by Chemical Formula 1 above forms a complex by binding the metal ions to PO⁻ positioned at an end group, such that the metal impurities present in the yellow phosphorus may be effectively removed.

In particular, in still another exemplary embodiment of the present invention, the additive in which a nitrogen atom is present at a position close to PO⁻ positioned at the end group as being represented by Chemical Formula 1 above, is used, such that additional electronic exchange takes place between unshared electron pair present in the nitrogen atom and the metal ions, thereby forming a more stable complex. Therefore, the metal impurities present in the yellow phosphorus may be significantly and effectively removed.

As specific examples, the additive represented by Chemical Formula 1 above may be at least one selected from the group consisting of amino-tris-methylene phosphoric acid (ATMP), dimethylene triamine pentamethylene phosphoric acid (DTPMP), bis hexamethylene triamine pentamethylene phosphoric acid (BHTPMP), ethylenediamine tetramethylene phosphoric acid (EDTMP), and hexamethylene diamine tetramethylene phosphoric acid (HDTMP).

In the additives, the nitrogen atom is present at the position close to PO⁻ positioned at the end group, such that additional electronic exchange takes place between the unshared electron pair present in the nitrogen atom and the metal ions, thereby forming a more stable complex. Therefore, the metal impurities present in the yellow phosphorus may be significantly and effectively removed.

In still another exemplary embodiment of the present invention, the metal impurities present in the yellow phosphorus are converted into an ionic form which is well soluble in water. In particular, the hydrogen peroxide is separated into water and oxygen, thereby generating a strong oxidization action, such that the metal impurities present in the yellow phosphorus are converted into an ionic form which is well soluble in water. The additive represented by Chemical Formula 1 above allows the impurities converted into an ionic form to form the complex with the additive, thereby providing an effect of purifying the yellow phosphorus.

In still another exemplary embodiment of the present invention, a processing temperature which is effective in removing the impurities is preferably 45 to 75° C. When the processing temperature is less than 45° C., the yellow phosphorus is present as a solid, which is not liquefied, such that the stirring is not effective, and when the processing temperature is more than 75° C., the hydrogen peroxide is rapidly decomposed, thereby decreasing an oxidization efficiency, or a temperature of a continuous reaction container is increased due to a decomposition reaction of hydrogen peroxide which is an exothermic reaction, thereby causing risk of safety.

In still another exemplary embodiment of the present invention, the additive represented by Chemical Formula 1 used in this step preferably has a concentration of 3 wt % or less relative to the yellow phosphorus. When the concentration of the additive is more than 3 wt % or more, the additive has an excessive amount as compared to the metal ion impurities in the yellow phosphorus, and additional cost is caused during wastewater treatment after the process is completed, thereby increasing the production cost. In addition, when a combustion process which is a subsequent process of the process is performed, the remaining additive is oxidized to increase total organic carbon (TOC), total nitrogen (TN), and the like, of the phosphoric acid to be produced, which reduces purity. Therefore, it is required to maintain the concentration of the additive within appropriate range.

Hereinafter, the present invention will be described in detail through preferable Examples of the present invention and Comparative Examples compared therewith.

Examples 1 to 2

(1) [Experimental Method]

1. 3.5 mass % of hydrogen peroxide was prepared by diluting 30 mass % of hydrogen peroxide with water.
2. An agitator was prepared, and then raw material yellow phosphorus and the hydrogen peroxide were added to a beaker.
3. A concentration of the added hydrogen peroxide was confirmed by titration of hydrogen peroxide, and water was further added to control the concentration.
4. The yellow phosphorus was melted by increasing a temperature to be 45° C. to 75° C.
5. When the yellow phosphorus was melted to be a liquid, the liquid was primarily purified with the hydrogen peroxide by stirring, and then the hydrogen peroxide was removed by slightly decreasing the temperature. Next, secondary purification was performed by adding a solution including the hydrogen peroxide and an additive, followed by stirring.
6. Time required for total stirring was set within 3 hours.
7. When a washing process was completed, metal impurities in the yellow phosphorus were analyzed by ICP-OES (Perkin elmer, Optima 7300DV) and ICP-MS (Perkin Elmer, DRC2).

(2) Experimental Results

Example 1

30 mass % of hydrogen peroxide (13 g) was added to a beaker and water was added thereto so as to control a concentration of the hydrogen peroxide to be 3.5 mass % or more. Then, raw material yellow phosphorus (5 g) was added thereto. The raw material yellow phosphorus is required to be stored in water due to risk of ignition in the air. In addition, due to the water to be added at the time of mixing in the beaker, the concentration of the hydrogen peroxide may be reduced to be 3 mass % or less. Accordingly, it was required to confirm whether the concentration of the hydrogen peroxide is 3 mass % by titration of the hydrogen peroxide after mixing in the beaker, and the experiment proceeded with the hydrogen peroxide having a concentration of 3 mass %. Temperature was maintained to be 60 degrees, and the product was stirred for 3 hours.

1) Primary Purification (Unit:Ppb)

TABLE 1

| Sample | Fe | Al | Sb |
|---|---|---|---|
| Raw Material Yellow Phosphorus | 1850 | 2780 | 8110 |
| Raw Material Yellow Phosphorus + 3 mass % Hydrogen peroxide | 760 | 260 | 920 |

Components were analyzed by ICP-OES. The detection limit of antimony (Sb) was 300 ppb, and the detection limits of iron (Fe) and aluminum (Al) were 100 ppb, respectively.

Then, secondary purification was performed by adding a solution to the raw material yellow phosphorus obtained after the primary purification was completed, the solution prepared by mixing each phosphate-based additive of the present invention with hydrogen peroxide. Results thereof were shown as follows.

2) Secondary Purification (Unit:Ppb)

TABLE 2

| | Sample | Fe | Al | Sb |
|---|---|---|---|---|
| | Raw Material Yellow Phosphorus | 1850 | 2780 | 8110 |
| Example 1-1 | Raw Material Yellow Phosphorus + 3 mass % Hydrogen peroxide + 0.5% ATMP | 13 | 16 | 830 |
| Example 1-2 | Raw Material Yellow Phosphorus + 3 mass % Hydrogen peroxide + 0.5% DTPMP | 8 | 10 | 820 |
| Example 1-3 | Raw Material Yellow Phosphorus + 3 mass % Hydrogen peroxide + 0.5% BHTPMP | <D.L. | <D.L. | 780 |
| Example 1-4 | Raw Material Yellow Phosphorus + 3 mass % Hydrogen peroxide + 0.5% EDTMP | 15 | 17 | 800 |

D.L: Detection limit

All measurement results obtained by ICP-OES were below the detection limit (D.L.), and accordingly, the measurement was performed by ICP-MS. As a result obtained by ICP-MS, it could be confirmed that impurities level after the secondary purification were remarkably reduced as compared to the treatment only with the hydrogen peroxide, that is, the primary purification. In particular, it could be confirmed that Fe and Al were almost completely purified up to ND level, and that the concentration of Sb which was not well removed was also reduced as compared to the method of using the hydrogen peroxide alone.

Example 2

Raw material yellow phosphorus having a different lot number was used, and the primary purification was performed with 3 mass % hydrogen peroxide by the same experimental method as Example 1 above, and then the secondary purification was performed under each concentration.

(Unit: ppb)

TABLE 3

| | Sample | Fe | Al | Sb |
|---|---|---|---|---|
| | Raw Material Yellow Phosphorus | 1470 | 2540 | 8240 |
| Example 2-1 | Raw Material Yellow Phosphorus + 3 mass % Hydrogen peroxide + 0.5% ATMP | 9 | 18 | 830 |
| Example 2-2 | Raw Material Yellow Phosphorus + 3 mass % Hydrogen peroxide + 0.5% DTPMP | <D.L. | <D.L. | 820 |
| Example 2-3 | Raw Material Yellow Phosphorus + 3 mass % Hydrogen peroxide + 0.5% BHTPMP | <D.L. | <D.L. | 780 |
| Example 2-4 | Raw Material Yellow Phosphorus + 3 mass % Hydrogen peroxide + 0.5% EDTMP | 10 | 16 | 800 |

D.L: Detection limit

It could be appreciated from both of Examples 1 and 2 that the addition of the additive represented by Chemical Formula 1 had a better purification effect as compared to the case in which the hydrogen peroxide was used alone.

Example 3

(1) [Experimental Method]

1. 3.5 mass % of diacetyl peroxide aqueous solution was prepared by diluting diacetyl peroxide with water.
2. An agitator was prepared, and then raw material yellow phosphorus and the diluted solution were added to a beaker.
3. A concentration of the oxidizing agent was confirmed by titration, and water was further added to control the concentration of the oxidizing agent to be 3 mass %.
4. The yellow phosphorus was melted by increasing a temperature to be 45° C. to 75° C.
5. When the yellow phosphorus was melted to be a liquid, stirring was performed.
6. Time required for total stirring was set within 3 hours.
7. When a washing process was completed, metal impurities in the yellow phosphorus were analyzed by ICP-OES (Perkin elmer, Optima 7300DV) and ICP-MS (Perkin Elmer, DRC2).

(2) Experimental Results 25 mass % of diacetyl peroxide (15 g) was added to a beaker and water was added thereto so as to control a concentration of the diacetyl peroxide aqueous solution to be 3.5 mass % or more. Then, raw material yellow phosphorus (5 g) was added thereto. The raw material yellow phosphorus is required to be stored in water due to risk of ignition in the air. In addition, due to the water to be added at the time of mixing in the beaker, the concentration of the diacetyl peroxide used as the oxidizing agent may be reduced to be 3 mass % or less. Accordingly, it was required to confirm the concentration of the diacetyl peroxide by titration after mixing in the beaker, and the experiment proceeded with the hydrogen peroxide having a concentration of 3 mass %. The raw material yellow phosphorus was melted by increasing a temperature to be 60 degrees, and stirred for 3 hours.

1) Primary Purification (Unit: ppb)

TABLE 4

| Sample | Fe | Al | Sb |
|---|---|---|---|
| Raw Material Yellow Phosphorus | 1850 | 2780 | 8110 |
| Raw Material Yellow Phosphorus + 3 mass % Diacetyl Peroxide | 680 | 400 | 1700 |

Components were analyzed by ICP-OES. The detection limit of antimony (Sb) was 300 ppb, and the detection limits of iron (Fe) and aluminum (Al) were 100 ppb, respectively.

Then, secondary purification was performed by adding a solution to the raw material yellow phosphorus obtained after the primary purification was completed, the solution prepared by mixing each phosphate-based additive of the present invention with diacetyl peroxide. Results thereof were shown as follows.

2) Secondary Purification (Unit: ppb)

TABLE 5

|  | Sample | Fe | Al | Sb |
|---|---|---|---|---|
|  | Raw Material Yellow Phosphorus | 1850 | 2780 | 8110 |
| Example 3-1 | Raw Material Yellow Phosphorus + 3 mass % Diacetyl Peroxide + 0.5% ATMP | 50 | 58 | 1230 |
| Example 3-2 | Raw Material Yellow Phosphorus + 3 mass % Diacetyl Peroxide + 0.5% DTPMP | 38 | 26 | 1170 |
| Example 3-3 | Raw Material Yellow Phosphorus + 3 mass % Diacetyl Peroxide + 0.5% BHTPMP | 5 | 7 | 860 |
| Example 3-4 | Raw Material Yellow Phosphorus + 3 mass % Diacetyl Peroxide + 0.5% EDTMP | 20 | 29 | 950 |

Diacetyl peroxide which is organic peroxide was used to replace hydrogen peroxide for the primary purification. In the results of the primary purification using diacetyl peroxide, a purification rate was slightly reduced as compared to the case of using hydrogen peroxide. However, after the secondary purification including the additive, an amount of impurities was remarkably decreased, which had similar level as the results of the secondary purification of Example 1.

Example 4

(1) [Experimental Method]

1. 300 g of mixed acid was prepared by mixing 16 wt % of nitric acid with 62 mass % of sulfuric acid at a mass ratio of 1:1.
2. An agitator was prepared, and then raw material yellow phosphorus and the mixed acid were added to a beaker.
3. The yellow phosphorus was melted by increasing a temperature to be 45° C. to 75° C.
4. When the yellow phosphorus was melted to be a liquid, stirring was performed.
5. Time required for total stirring was set within 3 hours.
6. When a washing process was completed, metal impurities in the yellow phosphorus were analyzed by ICP-OES (Perkin elmer, Optima 7300DV) and ICP-MS (Perkin Elmer, DRC2).

(2) Experimental Results 300 g of mixed acid was prepared by mixing 16 wt % of nitric acid with 62 mass % of sulfuric acid at a mass ratio of 1:1. 20 g of raw material yellow phosphorus was added thereto, and a temperature was increased to be 60 degrees to stir the raw material yellow phosphorus. Time required for the stirring was set within 2 hours.

1) Primary Purification (Unit: ppb)

TABLE 6

| Sample | Fe | Al | Sb |
|---|---|---|---|
| Raw Material Yellow Phosphorus | 1850 | 2780 | 8110 |
| Raw Material Yellow Phosphorus + 3 mass % Mixed Acid | 180 | 200 | 450 |

Components were analyzed by ICP-OES. The detection limit of antimony (Sb) was 300 ppb, and the detection limits of iron (Fe) and aluminum (Al) were 100 ppb, respectively.

Then, secondary purification was performed by adding a solution to the raw material yellow phosphorus obtained after the primary purification was completed, the solution prepared by mixing each phosphate-based additive of the present invention with 3 mass % of hydrogen peroxide. Results thereof were shown as follows.

2) Secondary Purification (Unit: ppb)

TABLE 7

|  | Sample | Fe | Al | Sb |
|---|---|---|---|---|
|  | Raw Material Yellow Phosphorus | 1850 | 2780 | 8110 |
| Example 4-1 | Raw Material Yellow Phosphorus + 3 mass % Mixed Acid + 0.5% ATMP | <D.L | <D.L | 380 |
| Example 4-2 | Raw Material Yellow Phosphorus + 3 mass % Mixed Acid + 0.5% DTPMP | <D.L | <D.L | 360 |
| Example 4-3 | Raw Material Yellow Phosphorus + 3 mass % Mixed Acid + 0.5% BHTPMP | <D.L | <D.L | 290 |
| Example 4-4 | Raw Material Yellow Phosphorus + 3 mass % Mixed Acid + 0.5% EDTMP | <D.L | <D.L | 390 |

D.L: Detection limit

The mixed acid of nitric acid and sulfuric acid was used for the primary purification. Since the mixed acid had strong oxidizing power, the amount of impurities was remarkably reduced as compared to Example 1 using hydrogen peroxide. Then, when the secondary purification was performed by adding each phosphate-based additive in the presence of a solution of hydrogen peroxide, it could be confirmed in most cases that an amount of impurities of aluminum (Al) and iron (Fe) was below the detection limit. In view of the concentration of impurities, the use of the mixed acid was the best way; however, yield thereof was low due to strong oxidizing power. However, even in this case of using the mixed acid, efficiency was also increased after the secondary purification using each phosphate-based additive was performed.

Example 5

(1) [Experimental Method]

1. 3.5 mass % of hydrogen peroxide was prepared by diluting 30 mass % of hydrogen peroxide with water.
2. An agitator was prepared, and then raw material yellow phosphorus and hydrogen peroxide were added to a beaker.
3. A concentration of the added hydrogen peroxide was confirmed by titration of hydrogen peroxide, and water was further added to control the concentration.
4. The yellow phosphorus was melted by increasing a temperature to be 45° C. to 75° C.
5. When the yellow phosphorus was melted to be a liquid, an additive represented by Chemical Formula was added to the liquid, followed by stirring.
6. Time required for total stirring was set within 3 hours.
7. When a washing process was completed, metal impurities in the yellow phosphorus were analyzed by ICP-OES (Perkin elmer, Optima 7300DV) and ICP-MS (Perkin Elmer, DRC2).

(2) Experimental Results 30 mass % of hydrogen peroxide (13 g) was added to a beaker and water was added thereto so as to control a concentration of the hydrogen peroxide to be 3.5 mass % or more. Then, raw material yellow phosphorus (5 g) was added thereto. The raw material yellow phosphorus is required to be stored in water due to risk of ignition in the air. In addition, due to the water to be added at the time of mixing in the beaker, the concentration of the hydrogen peroxide may be reduced to be 3 mass % or less. Accordingly, it was required to confirm whether the concentration of the hydrogen peroxide is 3 mass % by titration of the hydrogen peroxide after mixing in the beaker, and the experiment proceeded with the hydrogen peroxide having a concentration of 3 mass %. When the raw material yellow phosphorus started to be melted by increasing a temperature to be 60 degrees, 0.5 mass % of each phosphate-based additive of the present invention was added thereto, followed by stirring for 3 hours.

(Unit: ppb)

TABLE 8

| | Sample | Fe | Al | Sb |
|---|---|---|---|---|
| | Raw Material Yellow Phosphorus | 1770 | 2950 | 9710 |
| Example 5-1 | Raw Material Yellow Phosphorus + 3 mass % Hydrogen peroxide + 0.5% ATMP | 35 | 48 | 900 |
| Example 5-2 | Raw Material Yellow Phosphorus + 3 mass % Hydrogen peroxide + 0.5% DTPMP | 11 | 17 | 850 |

TABLE 8-continued

| | Sample | Fe | Al | Sb |
|---|---|---|---|---|
| Example 5-3 | Raw Material Yellow Phosphorus + 3 mass % Hydrogen peroxide + 0.5% BHTPMP | 33 | 45 | 790 |
| Example 5-4 | Raw Material Yellow Phosphorus + 3 mass % Hydrogen peroxide + 0.5% EDTMP | 30 | 53 | 820 |

Hydrogen peroxide and each additive were simultaneously added to raw material yellow phosphorus at a time without performing the primary purification with hydrogen peroxide, followed by the secondary purification with each additive. Results obtained by ICP-OES were below the detection limit (D.L.), and accordingly, the measurement was performed by ICP-MS. As a result obtained by ICP-MS, it could be confirmed that impurities level were remarkably reduced as compared to the primary purification of Example 1 treated only with hydrogen peroxide. In particular, it could be confirmed that Fe and Al were almost completely purified up to ND level, and that the concentration of Sb which was not well removed was also reduced as compared to the method of using the hydrogen peroxide alone.

Example 6

Purification effects were confirmed by applying raw material yellow phosphorus to actual processes, and details for the processes were provided as follows. 2.0 ton of raw material yellow phosphorus and 2.7 ton of 3.0 mass % of hydrogen peroxide were added to a stirred tank, and 0.5% DTPMP relative to the raw material yellow phosphorus was added thereto. Each obtained sample was analyzed by ICP-OES since there was a problem in collecting the samples in the actual processes.

(Unit: ppb)

TABLE 9

| | Sample | Fe | Al | Sb |
|---|---|---|---|---|
| | Raw Material Yellow Phosphorus | 1520 | 2190 | 8660 |
| Example 6-1 | Raw Material Yellow Phosphorus + 3 mass % Hydrogen peroxide | 830 | 220 | 960 |
| Example 6-2 | Raw Material Yellow Phosphorus + 3 mass % Hydrogen peroxide + 0.5% DTPMP | <D.L. | <D.L. | 840 |

D.L: Detection limit

When the process was performed with each additive of the present invention, it could be confirmed that analysis results were below detection limit (D.L.). Accordingly, it could be appreciated that sufficient effects were provided even in the actual process.

In addition, the method of using iodine-based oxidizing agent as mentioned in the background above has problems such as safety of an operator, waste water treatment, and the like, due to significantly strong oxidizing power. However, the method according to the present invention had any problems related to environmental safety regarding the operator, waste water, and the like.

As a result obtained from the actual processes according to Example 6, small precautions were only required in the addition of hydrogen peroxide, and waste liquid discharged after the process satisfied discharge standards of Total N content, Total P content, and the like, when decomposition of hydrogen peroxide and pH treatment are performed. Accordingly, it could be confirmed that excellent effects were obtained in view of environment-friendly aspect.

Comparative Examples 1 to 3

Comparative Example 1

30 mass % of hydrogen peroxide (13 g) was added to a beaker and water was added thereto so as to control a concentration of the hydrogen peroxide to be 3.5 mass % or more. Then, raw material yellow phosphorus (5 g) was added thereto. The raw material yellow phosphorus is required to be stored in water due to risk of ignition in the air. In addition, due to the water to be added at the time of mixing in the beaker, the concentration of the hydrogen peroxide may be reduced to be less than 3 mass %. Accordingly, it was required to confirm whether the concentration of the hydrogen peroxide is 3 mass % by titration of the hydrogen peroxide after mixing in the beaker, and the experiment proceeded with the hydrogen peroxide having a concentration of 3 mass %. The experiment was conducted in two ways; one way was to perform the primary purification with hydrogen peroxide, followed by the secondary purification with the addition of the additive, and the other way was to perform purification at a time by simultaneously adding hydrogen peroxide and each additive. When the raw material yellow phosphorus started to be melted by increasing a temperature to be 60 degrees, purification experiments proceeded in each of the two ways by stirring. The used additives were ethylenediaminetetraacetic acid (EDTA) and diethylenetriaminepentaacetic acid (DTPA) which are polycarboxylic acids, each having an amount of 0.5 mass % to 1.0 mass %, and the stirring was performed for 3 hours. After the experiments, analysis was performed by ICP-OES.

1) Primary Purification: Raw Material Yellow Phosphorus+Hydrogen peroxide (Unit: ppb)

TABLE 10

| | Sample | Fe | Al | Sb |
|---|---|---|---|---|
| | Raw Material Yellow Phosphorus | 1760 | 2820 | 8300 |
| Comparative Example 1-1 | Raw Material Yellow Phosphorus + 3 mass % Hydrogen peroxide | 760 | 260 | 920 |

2) Secondary Purification: Raw Material Yellow Phosphorus+Hydrogen peroxide+Additive (Unit: ppd)

TABLE 11

| | Sample | Fe | Al | Sb |
|---|---|---|---|---|
| Comparative Example 1-2-a | Raw Material Yellow Phosphorus + 3 mass % Hydrogen peroxide + 0.5% EDTA | 780 | 300 | 950 |
| Comparative Example 1-3-a | Raw Material Yellow Phosphorus + 3 mass % Hydrogen peroxide + 1.0% EDTA | 830 | 360 | 1080 |
| Comparative Example 1-4-a | Raw Material Yellow Phosphorus + 3 mass % Hydrogen peroxide + 0.5% DTPA | 750 | 280 | 960 |

TABLE 11-continued

| | Sample | Fe | Al | Sb |
|---|---|---|---|---|
| Comparative Example 1-5-a | Raw Material Yellow Phosphorus + 3 mass % Hydrogen peroxide + 1.0% DTPA | 840 | 360 | 1150 |

3) Simultaneous Addition of Hydrogen peroxide+Additive (Unit: ppb)

TABLE 12

| | Sample | Fe | Al | Sb |
|---|---|---|---|---|
| Comparative Example 1-2-b | Raw Material Yellow Phosphorus + 3 mass % Hydrogen peroxide + 0.5% EDTA | 890 | 460 | 1060 |
| Comparative Example 1-3-b | Raw Material Yellow Phosphorus + 3 mass % Hydrogen peroxide + 1.0% EDTA | 970 | 430 | 1210 |
| Comparative Example 1-4-b | Raw Material Yellow Phosphorus + 3 mass % Hydrogen peroxide + 0.5% DTPA | 880 | 390 | 1010 |
| Comparative Example 1-5-b | Raw Material Yellow Phosphorus + 3 mass % of Hydrogen peroxide + 1.0% DTPA | 960 | 420 | 1240 |

When ethylenediaminetetraacetic acid (EDTA) which is the most commonly used in polycarboxylic acid chelate compounds, and diethylenetriaminepentaacetic acid (DTPA) having a similar structure as EDTA were used, the results thereof were not good as Examples using the phosphate-based additive of the present invention.

Comparative Example 2

Iminodiacetic acid (IDA) which is polycarboxylic acid containing nitrogen and citric acid (CTA) which is oxycarboxylic acid in an oxidized form due to oxygen, were added to perform experiments. 30 mass % of hydrogen peroxide (13 g) was added to a beaker and water was added thereto so as to control a concentration of the hydrogen peroxide to be 3.5 mass % or more. Then, raw material yellow phosphorus (5 g) having the same lot number as Comparative Example 1 was added thereto. The raw material yellow phosphorus is required to be stored in water due to risk of ignition in the air. In addition, due to the water to be added at the time of mixing in the beaker, the concentration of the hydrogen peroxide may be reduced to be less than 3 mass %. Accordingly, it was required to confirm whether the concentration of the hydrogen peroxide is 3 mass % by titration of the hydrogen peroxide after mixing in the beaker, and the experiment proceeded with the hydrogen peroxide having a concentration of 3 mass %. The experiment was conducted in two ways; one way was to perform the primary purification with hydrogen peroxide, followed by the secondary purification with the addition of the additive, and the other way was to perform purification at a time by simultaneously adding hydrogen peroxide and each additive. When the raw material yellow phosphorus started to be melted by increasing a temperature to be 60 degrees, iminodiacetic acid (IDA) which is polycarboxylic acid containing nitrogen acid (CTA) which is oxycarboxylic acid in an oxidized form due to oxygen each having an amount of 0.5 mass % to 1.0 mass %, were added thereto, followed by stirring for 3 hours. After the experiments, analysis was performed by ICP-OES.

1) Primary Purification: Raw Material Yellow Phosphorus+Hydrogen peroxide (Unit: ppb)

TABLE 13

| | Sample | Fe | Al | Sb |
|---|---|---|---|---|
| | Raw Material Yellow Phosphorus | 1760 | 2820 | 8300 |
| Comparative Example 2-1 | Raw Material Yellow Phosphorus + 3 mass % Hydrogen peroxide | 760 | 260 | 920 |

2) Secondary Purification:
Raw Material Yellow Phosphorus+Hydrogen peroxide+Additive (Unit: ppb)

TABLE 14

| | Sample | Fe | Al | Sb |
|---|---|---|---|---|
| Comparative Example 2-2-a | Raw Material Yellow Phosphorus + 3 mass % Hydrogen peroxide + 0.5% IDA | 770 | 320 | 890 |
| Comparative Example 2-3-a | Raw Material Yellow Phosphorus + 3 mass % Hydrogen peroxide + 1.0% IDA | 860 | 340 | 1050 |
| Comparative Example 2-4-a | Raw Material Yellow Phosphorus + 3 mass % Hydrogen peroxide + 0.5% CTA | 800 | 300 | 980 |
| Comparative Example 2-5-a | Raw Material Yellow Phosphorus + 3 mass % Hydrogen peroxide + 1.0% CTA | 860 | 370 | 1120 |

3) Simultaneous Addition of Hydrogen peroxide+Additive (Unit: ppb)

TABLE 15

| | Sample | Fe | Al | Sb |
|---|---|---|---|---|
| Comparative Example 2-2-b | Raw Material Yellow Phosphorus + 3 mass % Hydrogen peroxide + 0.5% IDA | 830 | 350 | 930 |
| Comparative Example 2-3-b | Raw Material Yellow Phosphorus + 3 mass % Hydrogen peroxide + 1.0% IDA | 890 | 380 | 1130 |
| Comparative Example 2-4-b | Raw Material Yellow Phosphorus + 3 mass % Hydrogen peroxide + 0.5% CTA | 850 | 350 | 1080 |
| Comparative Example 2-5-b | Raw Material Yellow Phosphorus + 3 mass % Hydrogen peroxide + 1.0% CTA | 940 | 450 | 1210 |

Generally, since the polycarboxylic acid produces a solid complex by binding various carboxylic acid groups to metal ions in a chelate form, the polycarboxylic acid has an excellent effect of removing the metal ions in the composition. The polycarboxylic acids used in Comparative Examples 1 and 2 were ethylenediaminetetraacetic acid (EDTA), diethylenetriaminepentaacetic acid (DTPA), Iminodiacetic acid (IDA), and citric acid (CTA), each being highly specific to the metal ions.

However, as shown in the above results, when the polycarboxylic acids were used as the additives, it was confirmed that purification effects of Fe or Al were not shown, unlike the case of using phosphate-based additives. In addition, in some cases, purification efficiency was rather decreased as compared to the case of only including 3 mass % of hydrogen peroxide.

The above results are resulted from different functional groups between the polycarboxylic acid and phosphoric acid. Basically, the stirring process of the raw material yellow phosphorus and hydrogen peroxide partially modifies the raw material yellow phosphorus into phosphorus pentoxide, and the phosphorus pentoxide reacts with water present in the solution to produce a small amount of phosphoric acid. Accordingly, the phosphate-based additives having the phosphoric acid may easily react due to high affinity with the solution, thereby providing more excellent purification efficiency. In addition, the polycarboxylic acid group is also a functional group which is capable of being easily dissolved, but has a lower affinity with the raw material yellow phosphorus and partially produced phosphoric acid than that of the phosphate-based additives, thereby having decreased efficiency.

In addition, it has been occasionally reported that when additives similar to the ethylenediaminetetraacetic acid (EDTA) or the diethylenetriaminepentaacetic acid (DTPA) are used, efficiency is decreased in the solution having a hydrogen peroxide composition. For example, in a hydrogen peroxide-based copper etching solution, various additives were used for stability of the hydrogen peroxide, wherein when the additives are ethylene diamine-based additives such as ethylenediaminetetraacetic acid (EDTA), diethylenetriaminepentaacetic acid (DTPA), and the like, there are many cases in which there is no effect of securing the stability of the hydrogen peroxide. In a reactant having a composition in which raw material yellow phosphorus, phosphorus pentoxide, hydrogen peroxide, and water, effects of EDTA, DTPA, and the like, may be decreased as similar to the copper etching solution.

Further, polycarboxylic acid salt types (sodium and potassium) are also commonly and largely used as a chelate compound, but are not used in the present invention. The reason is because when an excessive amount of sodium or potassium is included during purification of the raw material yellow phosphorus, sodium or potassium functions as impurities in the phosphoric acid which is a final product, such that additional purification is required.

Comparative Example 3

Additives in which nitrogen is not included at an adjacent position among phosphate-based additives were used to perform experiments. The used additives were hydroxyethylidene diphosphonic acid (HEDP) and phosphono butane tri-acetic acid (PBTA) each having at least one phosphoric acid group. 30 mass % of hydrogen peroxide (13 g) was added to a beaker and water was added thereto so as to control a concentration of the hydrogen peroxide to be 3.5 mass % or more. Then, raw material yellow phosphorus (5 g) having the same lot number as Comparative Example 1 was added thereto. The raw material yellow phosphorus is required to be stored in water due to risk of ignition in the air. In addition, due to the water to be added at the time of mixing in the beaker, the concentration of the hydrogen peroxide may be reduced to be less than 3 mass %. Accordingly, it was required to confirm whether the concentration of the hydrogen peroxide is 3 mass % by titration of the hydrogen peroxide after mixing in the beaker, and the experiment proceeded with the hydrogen peroxide having a concentration of 3 mass %. The experiment was conducted in two ways; one way was to perform the primary purification with hydrogen peroxide, followed by the secondary purification with the addition of the additive, and the other way was to perform purification at a time by simultaneously adding hydrogen peroxide and each additive. When the raw material yellow phosphorus started to be melted by increasing a temperature to be 60 degrees, one of hydroxyethylidene diphosphonic acid (HEDP) and phosphono butane tri-acetic acid (PBTA) which are phosphate-based additives in which nitrogen is not included, each having an amount of 0.5 mass %, was added thereto, followed by stirring for 3 hours. After the experiments, analysis was performed by ICP-OES.

1) Primary Purification: Raw Material Yellow Phosphorus+Hydrogen peroxide (Unit: ppb)

TABLE 16

|  | Sample | Fe | Al | Sb |
|---|---|---|---|---|
|  | Raw Material Yellow Phosphorus | 1760 | 2820 | 8300 |
| Comparative Example 3-1 | Raw Material Yellow Phosphorus + 3 mass % Hydrogen peroxide | 760 | 260 | 920 |

2) Secondary Purification: Raw Material Yellow Phosphorus+Hydrogen peroxide+Additive (Unit: ppb)

TABLE 17

|  | Sample | Fe | Al | Sb |
|---|---|---|---|---|
| Comparative Example 3-2-a | Raw Material Yellow Phosphorus + 3 mass % Hydrogen peroxide + 0.5% HEDP | 640 | 230 | 860 |
| Comparative Example 3-3-a | Raw Material Yellow Phosphorus + 3 mass % Hydrogen peroxide + 0.5% PBTA | 710 | 280 | 870 |

3) Simultaneous Addition of Hydrogen peroxide+Additive (Unit: ppb)

TABLE 18

|  | Sample | Fe | Al | Sb |
|---|---|---|---|---|
| Comparative Example 3-2-b | Raw Material Yellow Phosphorus + 3 mass % Hydrogen peroxide + 0.5% HEDP | 710 | 250 | 890 |
| Comparative Example 3-3-b | Raw Material Yellow Phosphorus + 3 mass % Hydrogen peroxide + 0.5% PBTA | 740 | 300 | 910 |

Upon comparing Examples using the phosphate-based additive including nitrogen with Comparative Example 3 using the phosphate-based additive not including nitrogen, both of two additives had phosphoric acid groups, such that affinity with the raw material yellow phosphorus was higher than that of the polycarboxylic acid, and accordingly, some effect could be expected. However, as a result of the experiments, the phosphate-based additive not including nitrogen showed little effect, which means that there is another important factor in addition to the phosphoric acid groups of the additive during the purification of the raw material yellow phosphorus.

In general, end groups of the additive are bound with metal ions to produce a complex, wherein when nitrogen is present at a position close to PO⁻, additional electronic exchange takes place between unshared electron pair of the nitrogen and the metal ions to form a more stable complex. Accordingly, the phosphate-based additive including nitrogen used in Examples was changed into a more stable form by binding the metal ions to PO⁻, and then additionally binding the metal ions with the neighboring nitrogen, thereby providing better purification effects as compared to Comparative Example 3 using the additive not including nitrogen.

According to the method of the present invention, the impurities present in the yellow phosphorus used as the raw material of the phosphoric acid may be effectively removed, thereby increasing purity of the phosphoric acid.

In particular, various metal impurities such as antimony, iron, aluminum, and the like, may be effectively removed, and processes are relatively simple and environment-friendly.

Although the exemplary embodiments of the present invention have been described, various changes and modifications can be made by those skilled in the art without the scope of the appended claims of the present invention. Such changes and modifications should also be understood to fall within the scope of the present invention. Therefore, the protection scope of the present invention should be determined by the appended claims to be described below.

What is claimed is:

1. A method of purifying yellow phosphorus comprising:
removing impurities from the yellow phosphorus by adding an oxidizing agent to the yellow phosphorus, followed by stirring; and
removing impurities by adding a solution including an additive represented by the following Chemical Formula 1 to the yellow phosphorus from which the impurities are removed, followed by stirring:

[Chemical Formula 1]

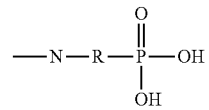

R is C1-C5 alkyl.

2. The method of claim 1, wherein the oxidizing agent is an organic peroxide, or a member selected from the group consisting of nitric acid, sulfuric acid, hydrochloric acid, hydrogen peroxide and combinations thereof.

3. The method of claim 1, wherein the additive represented by Chemical Formula 1 is at least one selected from the group consisting of amino-tris-methylene phosphoric acid (ATMP), dimethylene triamine pentamethylene phosphoric acid (DTPMP), bis hexamethylene triamine pentamethylene phosphoric acid (BHTPMP), ethylenediamine tetramethylene phosphoric acid (EDTMP), and hexamethylene diamine tetramethylene phosphoric acid (HDTMP).

4. The method of claim 1, wherein the impurities to be removed include any one selected from the group consisting of aluminum, iron, and antimony, as a metal ion.

5. The method of claim 1, wherein the impurities to be removed are antimony as a metal ion.

6. The method of claim 1, wherein the solution including the additive represented by Chemical Formula 1 has a hydrogen peroxide as a solvent.

7. The method of claim 1, wherein the removing of the impurities is performed at 45° C. to 75° C.

8. The method of claim 1, wherein the oxidizing agent has a concentration of 3 to 6 mass % relative to water.

9. The method of claim 1, wherein the additive has a concentration of 2 wt % or less relative to yellow phosphorus.

10. A method of purifying yellow phosphorus comprising:
removing impurities from the yellow phosphorus by adding a solution including an oxidizing agent and an additive represented by the following Chemical Formula 1 to the yellow phosphorus, followed by stirring:

[Chemical Formula 1]

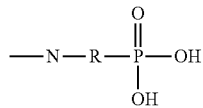

R is C1-C5 alkyl.

11. The method of claim 10, wherein the oxidizing agent is an organic peroxide, or a member selected from the group consisting of nitric acid, sulfuric acid, hydrochloric acid, hydrogen peroxide and combinations thereof.

12. The method of claim 10, wherein the additive represented by Chemical Formula 1 is at least one selected from the group consisting of amino-tris-methylene phosphoric acid (ATMP), dimethylene triamine pentamethylene phosphoric acid (DTPMP), bis hexamethylene triamine pentamethylene phosphoric acid (BHTPMP), ethylenediamine tetramethylene phosphoric acid (EDTMP), and hexamethylene diamine tetramethylene phosphoric acid (HDTMP).

13. The method of claim 10, wherein the impurities to be removed include any one selected from the group consisting of aluminum, iron, and antimony, as a metal ion.

14. The method of claim 10, wherein the impurities to be removed are antimony as a metal ion.

15. The method of claim 10, wherein the removing of the impurities is performed at 45° C. to 75° C.

16. The method of claim 10, wherein the oxidizing agent has a concentration of 3 to 6 mass % relative to water.

17. The method of claim 10, wherein the additive has a concentration of 2 wt % or less relative to yellow phosphorus.

* * * * *